(12) United States Patent
Tae

(10) Patent No.: US 10,466,673 B2
(45) Date of Patent: Nov. 5, 2019

(54) CONTROL DEVICE FOR AIR CONDITIONING AND CONTROL METHOD THEREOF

(71) Applicant: Samsung Electronics Co., Ltd., Suwon-si (KR)

(72) Inventor: Sangjin Tae, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 15/446,372

(22) Filed: Mar. 1, 2017

(65) Prior Publication Data
US 2017/0254555 A1    Sep. 7, 2017

(30) Foreign Application Priority Data

Mar. 4, 2016 (KR) .......................... 10-2016-0026641

(51) Int. Cl.
*F24F 11/00* (2018.01)
*G05B 19/048* (2006.01)
(Continued)

(52) U.S. Cl.
CPC ............ *G05B 19/048* (2013.01); *F24F 11/30* (2018.01); *F24F 11/46* (2018.01); *F24F 11/61* (2018.01); *F24F 11/62* (2018.01); *G05D 23/1902* (2013.01); *G05D 23/1919* (2013.01); *G05D 23/1951* (2013.01); *F24F 11/32* (2018.01);
(Continued)

(58) Field of Classification Search
CPC .. F24F 11/30; F24F 11/32; F24F 11/46; F24F 11/56; F24F 11/61; F24F 11/62; F24F 11/65; F24F 2110/10; F24F 2120/10; F24F 2120/20; F24F 2140/50; F24F 2140/60;
(Continued)

(56) References Cited

U.S. PATENT DOCUMENTS 4,753,388 A   6/1988  Rummage
6,205,801 B1  3/2001  Riglos et al.
(Continued)

FOREIGN PATENT DOCUMENTS

JP   59-147943   8/1984
JP   9-14721     1/1997
(Continued)

OTHER PUBLICATIONS

Extended European Search Report dated Mar. 2, 2018, in corresponding European Patent Application No. 17159114.2.
(Continued)

*Primary Examiner* — Abdelmoniem I Elamin
(74) *Attorney, Agent, or Firm* — Staas & Halsey LLP

(57) ABSTRACT

A control device and methods for controlling an air conditioner are provided. The control device includes: an interface configured to receive measurement information indicating a detected indoor temperature; and a controller configured to, after initiating an air conditioning operation according to a set temperature which is inputted by a user, determine occurrence of an event according to a pre-defined criterion based on a relationship between the indoor temperature of the received measurement information and the set temperature with time, and, in response to the event occurring, change the set temperature.

16 Claims, 13 Drawing Sheets

(51) Int. Cl.

| | | |
|---|---|---|
| *G05D 23/19* | (2006.01) | |
| *F24F 11/30* | (2018.01) | |
| *F24F 11/62* | (2018.01) | |
| *F24F 11/46* | (2018.01) | |
| *F24F 11/61* | (2018.01) | |
| *F24F 110/10* | (2018.01) | |
| *F24F 140/50* | (2018.01) | |
| *F24F 140/60* | (2018.01) | |
| *F24F 11/32* | (2018.01) | |
| *F24F 120/20* | (2018.01) | |
| *F24F 11/65* | (2018.01) | |
| *F24F 11/56* | (2018.01) | |
| *F24F 120/10* | (2018.01) | |

(52) U.S. Cl.
CPC .............. *F24F 11/56* (2018.01); *F24F 11/65* (2018.01); *F24F 2110/10* (2018.01); *F24F 2120/10* (2018.01); *F24F 2120/20* (2018.01); *F24F 2140/50* (2018.01); *F24F 2140/60* (2018.01); *G05B 2219/2614* (2013.01)

(58) Field of Classification Search
CPC .......... G05B 19/048; G05B 2219/2614; G05D 23/1902; G05D 23/1919; G05D 23/1951
See application file for complete search history.

(56) References Cited

U.S. PATENT DOCUMENTS

| | | | |
|---|---|---|---|
| 6,622,926 B1 | 9/2003 | Sartain et al. | |
| 9,879,874 B2 * | 1/2018 | Motodani | F24F 11/70 |
| 2003/0216837 A1 | 11/2003 | Reich et al. | |
| 2004/0101606 A1 | 5/2004 | Ling et al. | |
| 2007/0012052 A1 | 1/2007 | Butler et al. | |
| 2008/0179409 A1 | 7/2008 | Seem | |
| 2008/0277486 A1 | 11/2008 | Seem et al. | |
| 2010/0019051 A1 * | 1/2010 | Rosen | G05D 23/1902 236/46 R |
| 2011/0107781 A1 * | 5/2011 | Kinugasa | F24F 11/83 62/157 |
| 2012/0091213 A1 | 4/2012 | Altonen et al. | |
| 2012/0166835 A1 * | 6/2012 | Boss | G06Q 50/06 713/320 |
| 2012/0197448 A1 * | 8/2012 | Shin | G06Q 10/06 700/286 |
| 2012/0296480 A1 | 11/2012 | Raman et al. | |
| 2013/0261805 A1 * | 10/2013 | Kuroiwa | G05D 23/00 700/276 |
| 2014/0067132 A1 | 3/2014 | Macek et al. | |
| 2014/0316584 A1 | 10/2014 | Matsuoka et al. | |
| 2015/0012143 A1 * | 1/2015 | Kinugasa | F24F 11/0009 700/276 |
| 2015/0135753 A1 * | 5/2015 | Abe | F25B 1/005 62/228.1 |
| 2015/0142180 A1 * | 5/2015 | Matsuoka | F24F 11/30 700/276 |
| 2015/0234369 A1 * | 8/2015 | Wen | F24F 11/30 700/278 |
| 2015/0285526 A1 | 10/2015 | Smith et al. | |

FOREIGN PATENT DOCUMENTS

| | | |
|---|---|---|
| JP | 11-201822 | 7/1999 |
| JP | 2006-506999 | 3/2006 |
| JP | 2013-83391 | 5/2013 |
| JP | 2013-95347 | 5/2013 |
| JP | 2013-210124 | 10/2013 |
| JP | 2013-238369 | 11/2013 |
| JP | 2014-142098 | 8/2014 |
| JP | 2014-163607 | 9/2014 |
| KR | 10-0286554 | 1/2001 |
| KR | 2001-0018555 | 3/2001 |
| KR | 10-2005-0013963 | 2/2005 |
| KR | 10-2006-0098081 | 9/2006 |
| KR | 10-0624710 | 9/2006 |
| KR | 10-0810508 | 3/2008 |
| KR | 10-2015-0002385 | 1/2015 |
| KR | 10-1496645 | 2/2015 |

OTHER PUBLICATIONS

Partial European Search report dated Sep. 21, 2017 in corresponding European Patent Application No. 17159114.2.
European Office Action dated Nov. 12, 2018 in corresponding European Patent Application No. 17 159 114.2.

* cited by examiner

1000

CONTROL DEVICE FOR AIR CONDITIONING AND CONTROL METHOD THEREOF

CROSS-REFERENCE TO RELATED APPLICATIONS

This application claims priority from Korean Patent Application No. 10-2016-0026641, filed on Mar. 4, 2016, in the Korean Intellectual Property Office, the disclosure of which is incorporated herein by reference in its entirety.

BACKGROUND

1. Field

Apparatuses and methods consistent with exemplary embodiments relate to a control device for air conditioning and a control method therefor, and more particularly, to a control device which can enhance energy efficiency of an air conditioner, and a control method therefor 2. Description of the Related Art An air conditioner is a device which is installed in a space, such as a house, an office, a store, and a hoop house for farming, to control temperature, humidity, cleanliness and an air current in order to provide an indoor environment which is pleasant for people to live or an indoor environment suitable for growing crops.

In addition, system air conditioners (SACs) are widely used in a complex such as a school or a factory or largescale facilities such as a whole building. Since the SAC has a convenience of easily operating and managing a plurality of individual air conditioners, recent buildings are designed in consideration of installation of the SACs, and the SAC is installed during the construction of a building.

However, unlike a small air conditioner used in a household, the SAC performs air conditioning in a largescale area and various environments. Therefore, there is a problem of high energy consumption.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a control device which can enhance energy efficiency of an air conditioner, and a control method therefor.

According to an aspect of an exemplary embodiment, there is provided a control device of an air conditioner, the control device including: an interface configured to receive measurement information indicating a detected indoor temperature; and a controller configured to, after initiating an air conditioning operation according to a set temperature which is inputted by a user, determine occurrence of an event according to a pre-defined criterion based on a relationship between the indoor temperature of the received measurement information and the set temperature with time, and, in response to the event occurring, change the set temperature.

The controller may be configured to determine that the event occurs in response to a degree of a change in the indoor temperature detected during a predetermined time from a time at which the air conditioning operation is initiated being lower than a pre-defined initial variation value.

In response to a degree of a change in the detected indoor temperature after a predetermined time elapses after the air conditioning operation is initiated being greater than a pre-defined median variation value, the controller may be configured to determine that the event occurs.

In response to a deviation between the detected indoor temperature and the set temperature after a predetermined time elapses after the air conditioning operation is initiated being greater than a pre-defined normal state value, the controller may be configured to determine that the event occurs.

In response to the deviation being greater than the pre-defined normal state value, and the set temperature being lower than a threshold cooling temperature during a cooling operation and the set temperature being higher than a threshold heating temperature during a heating operation, the controller may be configured to determine that the event occurs.

The pre-defined criterion may be related to an amount of power consumed for driving an outdoor unit of the air conditioner, and the controller may be configured to, in response the event occurring during a cooling operation, increase the set temperature, and, in response to the event occurring during a heating operation, reduce the set temperature.

In response to the event occurring during a cooling operation, the controller may be configured to increase the set temperature such that an outdoor unit of the air conditioner is turned off at the indoor temperature detected after the predetermined time elapses, and, in response to the event occurring during a heating operation, the controller may be configured to reduce the set temperature such that an outdoor unit of the air conditioner is turned off at the indoor temperature detected after the predetermined time elapses.

In response to a time during which the air conditioning operation is performed exceeding a predetermined continuous time or the initiated air conditioning operation continuing until a predetermined end time, the controller may be configured to determine that the event occurs and control the air conditioner to stop the air conditioning operation.

In response to a user's input to initiate and terminate the air conditioning operation being repeated a predetermined number of times or more within a predetermined time, the controller may be configured to determine that the event occurs.

The interface may be connected with a plurality of air conditioners, and the control device may further include a display configured to display an air conditioning state of each of the plurality of air conditioners and information on whether the event occurs.

According to an aspect of another exemplary embodiment, there is provided a control method of an air conditioner, the control method including: receiving measurement information indicating a detected indoor temperature; after initiating an air conditioning operation according to a set temperature which is inputted by a user, determining occurrence of an event according to a pre-defined criterion based on a relationship between the indoor temperature of the received measurement information and the set temperature with time; and, in response to the event occurring, changing the set temperature.

The determining may include determining that the event occurs in response to a degree of a change in the indoor temperature detected during a predetermined time from a time at which the air conditioning operation is initiated being lower than a pre-defined initial variation value.

The determining may include, in response to a degree of a change in the detected indoor temperature after a predetermined time elapses after the air conditioning operation is initiated being greater than a pre-defined median variation value, determining that the event occurs.

The determining may include, in response to a deviation between the detected indoor temperature and the set temperature after a predetermined time elapses after the air conditioning operation is initiated being greater than a pre-defined normal state value, determining that the event occurs.

The determining may include, in response to the deviation being greater than the pre-defined normal state value, and the set temperature being lower than a threshold cooling temperature during a cooling operation and the set temperature being higher than a threshold heating temperature during a heating operation, determining that the event occurs.

The pre-defined criterion may be related to an amount of power consumed for driving an outdoor unit of the air conditioner, and the changing may include, in response the event occurring during a cooling operation, increasing the set temperature, and, in response to the event occurring during a heating operation, reducing the set temperature.

The changing may include: in response to the event occurring during a cooling operation, increasing the set temperature such that an outdoor unit of the air conditioner is turned off at the indoor temperature detected after the predetermined time elapses, and, in response to the event occurring during a heating operation, reducing the set temperature such that an outdoor unit of the air conditioner is turned off at the indoor temperature detected after the predetermined time elapses.

The control method may further include, in response to a time during which the air conditioning operation is performed exceeds a predetermined continuous time or the initiated air conditioning operation continuing until a predetermined end time, determining that the event occurs and stopping the air conditioning operation.

The determining may include, in response to a user's input to initiate and terminate the air conditioning operation being repeated a predetermined number of times or more within a predetermined time, determining that the event occurs.

The control method may further include: connecting to a plurality of air conditioners, and displaying an air conditioning state of each of the plurality of air conditioners and information on whether the event occurs.

The control device or the control method of the present disclosure according to various exemplary embodiments as described above can reduce power consumption and increase the lifespan of an outdoor unit, and can provide a central control interface which is easy for a user to use.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Exemplary embodiments of the present disclosure will be described herein below with reference to the accompanying drawings. In the following description, well-known functions or constructions are not described in detail since they would obscure the invention in unnecessary detail. Also, the terms used herein are defined according to the functions of the present disclosure. Thus, the terms may vary depending on user's or operator's intension and usage. That is, the terms used herein must be understood based on the descriptions made herein.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

Figure 1:
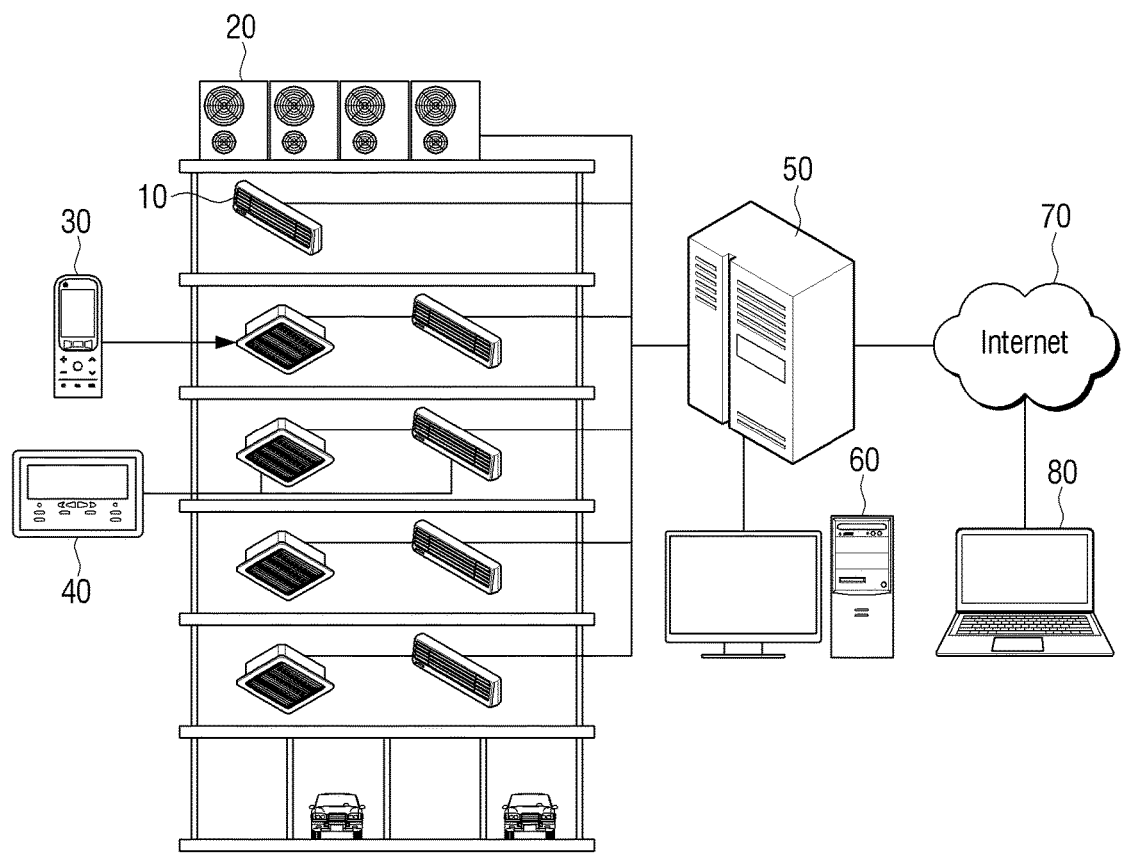
FIG. 1 is a view showing a structure of an air conditioning system according to an exemplary embodiment.

FIG. 1 is a view showing a structure of an air conditioning system according to an exemplary embodiment.

Referring to FIG. 1, the air conditioning system 1000 includes an indoor unit 10, an outdoor unit 20, a remote control 30, an integrated controller 40, a server 50, a central controller 60, and a remote controller 80.

One indoor unit or a plurality of indoor units 10 are installed on each floor of a building. The indoor unit 10 can also be called an indoor heat exchanger. The indoor unit 10 is connected with the outdoor unit 20. The indoor unit 10 exchanges refrigerant with the outdoor unit 20 via a pipe. An air conditioner including the indoor unit 10 and the outdoor unit 20 may support at least one of air conditioning functions of cooling to reduce a temperature of indoor air, heating to increase a temperature of indoor air, air blowing to generate an air current in a room, and dehumidifying to reduce indoor humidity. In the following description, the air conditioner will be explained as a heat pump air conditioner capable of cooling and heating. However, the air conditioner is not limited to the heat pump air conditioner, and the present disclosure can be applied to any device which can only cool or heat. The indoor unit 10 may be implemented in various forms such as a wall-mounted type, a stand type, and a ceiling type cassette.

The outdoor unit 20 exchanges heat with external air. The outdoor unit 20 can also be called an outdoor heat exchanger. Specifically, the outdoor unit 20 may exchange heat with external air through a cooling cycle which discharges, to the outside, heat transmitted from at least one of the plurality of indoor units 10 via refrigerant, or may exchange heat with external air through a heating cycle which absorbs heat lost by refrigerant from the outside. One outdoor unit or a plurality of outdoor units 20 may be installed in a building and the outdoor unit 20 may be connected with the plurality of indoor units 10. On this account, the illustrated air conditioner may be called a system air conditioner or a multi air conditioner. The outdoor unit 20 includes a compressor for compressing refrigerant. The compressor may be implemented in one of a constant speed type, a step type (or TPS), and an inverter type. The constant speed type compressor refers to a compressor which is controlled to be turned on/off according to an amount of cooling and heating load. The step type compressor refers to a compressor which includes a plurality of compressors and controls the number of compressors to work according to an amount of cooling and heating load. The inverter type compressor refers to a compressor which is controlled to linearly increase or reduce the working ability of the compressor according to an amount of cooling and heating load. In the following description, the air conditioner is of the constant speed type. However, energy efficiency can be enhanced by the other types of air conditioners such as a step type or inverter type air conditioner.

The remote control 30 controls the respective indoor units 10. Specifically, the remote control 30 receives a user's manipulation input. In addition, the remote control 30 outputs a signal for controlling the air conditioner according to the inputted user manipulation. The remote control 30 may communicate with the indoor units 10 in a wire or wireless manner.

The integrated controller 40 communicates with the plurality of indoor units 10. The integrated controller 40 may be installed on the wall of a corresponding floor in order to control all of the indoor units 10 installed on one floor of the building in one place.

The server 50 is connected with all of the indoor units 10 and the outdoor units 20 installed in a building. The server 50 may provide a solution program for monitoring and controlling all of the indoor units 10 and the outdoor units 20.

The central controller 60 may be installed in an air conditioning room of a building. In addition, the central controller 60 may be connected to a local area network (LAN) in the building such as Ethernet. The central controller 60 may control the driving of the air conditioner via the server 50 or directly.

The remote controller 80 is connected to a communication network such as Internet 70. In addition, the remote controller 80 may connect to the server 50 to control the indoor units 10 and the outdoor units 20 of each floor of a building. The remote controller 80 may be implemented by using a personal computer or a portable mobile device. The communication network that the server 50 and the remote controller 80 connect to may have a plurality of devices disposed therebetween such as a router device, a base station device, a gateway, a repeater, and a network of a different property such as a telephone circuit or a dedicated line.

In the above-described air conditioning system 1000, the control device of the present disclosure may be implemented in various forms. For example, the control device may be implemented as a control module embedded in the indoor unit 10. Alternatively, the control device may be implemented as the integrated controller 40 for controlling the indoor units 10 in one floor. Alternatively, the control device may be implemented as the server 50, the central controller 60, and the remote controller 80 for controlling all of the air conditioners of a building. The control device of each type may perform a control algorithm of the air conditioner for determining an air conditioner that is inefficiently driven based on a relationship between a set temperature and a detected indoor temperature without additional information from a separate sensor, and for reducing excessive and unnecessary energy consumption.

Figure 2:
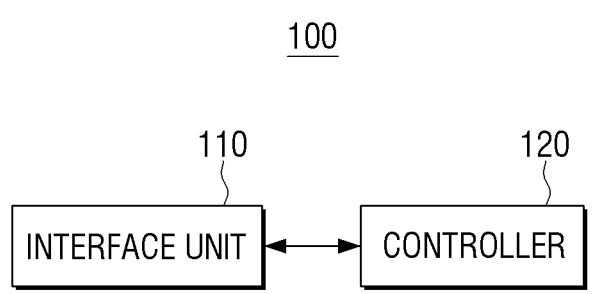
FIG. 2 is a block diagram showing a configuration of a control device according to an exemplary embodiment.

FIG. 2 is a block diagram showing a configuration of a control device according to an exemplary embodiment.

Referring to FIG. 2, the control device 100 includes an interface unit 110 and a controller 120.

The interface unit 110 provides an interface for receiving information. Specifically, the interface unit 110 may receive measurement information indicating a detected indoor temperature. In one embodiment, the interface unit 110 of the embedded control device 100 may be implemented by using a serial bus connected with an indoor temperature sensor. In another embodiment, the interface unit 110 of the standalone control device 100 may be implemented by using a wire and wireless communication interface. Specifically, the interface unit 110 may include a network communication chip to connect to the Ethernet of a local area network. Alternatively, the interface unit 110 may include a wireless communication chip and an antenna for wirelessly communicating, such as WiFi, Bluetooth, or the like. In addition, the interface unit 110 may receive, from the indoor unit 10 communicably connected therewith, measurement information indicating an indoor temperature detected by the indoor temperature sensor embedded in the indoor unit 10.

The controller 120 controls respective elements of the control device 100. Specifically, the controller 120 may determine excessive and inefficient driving of the air conditioner and control the respective elements to reduce energy consumption.

The controller 120 may determine whether the air conditioner to be controlled performs an air conditioning operation or not. The air conditioner performs the air conditioning operation to change an indoor temperature to a set temperature which is inputted by the user.

After initiating the air conditioning operation according to the set temperature which is inputted by the user, the controller 120 may determine occurrence of an event according to a pre-defined criterion based on a relationship between the indoor temperature indicated by the received measurement information and the set temperature with time. Specifically, after initiating the air conditioning operation according to the set temperature, the controller 120 may determine occurrence of an event indicating inefficient driving based on a change in the indoor temperature, a level of the set temperature, and a difference between the indoor temperature and the set temperature. That is, the pre-defined criterion for determining occurrence of an event is related to an amount of power consumed for driving the indoor unit of the air conditioner.

In addition, the controller 120 may determine occurrence of an event based on the elapse of time of performing the air conditioning operation. In addition, the controller 120 may determine occurrence of an event based on a user's control command on the air conditioner. The criteria for determining occurrence of an event will be described in detail below with reference to FIGS. 4 to 6 and FIGS. 8 and 9.

In response to an event occurring, the controller 120 changes the set temperature. Specifically, in response to it being determined that an event of inefficient driving occurs, the controller 120 may control a target air conditioner to change the set temperature. Herein, in response to an event occurring during a cooling operation, the controller 120 may increase the set temperature, and, in response to an event occurring during a heating operation, the controller 120 may reduce the set temperature. A detailed description will be provided with reference to FIG. 7.

In addition, in response to the time during which the air conditioning operation is performed exceeds a predetermined continuous time or the initiated air conditioning operation continuing until a predetermined end time, the controller 120 may determine that an event occurs and control the air conditioner to stop the air conditioning operation.

The controller 130 may include a central processing unit (CPU), a read only memory (ROM) in which a program for driving is stored, and a random access memory (RAM) which memorizes external information or data or is used as a memory area for a performed work. The CPU may be implemented by using various microprocessors such as a single core processor, a dual core processor, a triple core processor, and a quad core processor. The CPU, the ROM, and the RAM may be connected with one another via an internal bus.

The control device 100 described above may determine inefficiency of energy based on only existing information without expanding the configuration of the system, and change the set temperature so as to reduce power consumption and achieve efficient cooling and heating. Therefore, the control device 100 is eco-friendly and economical.

Figure 3:
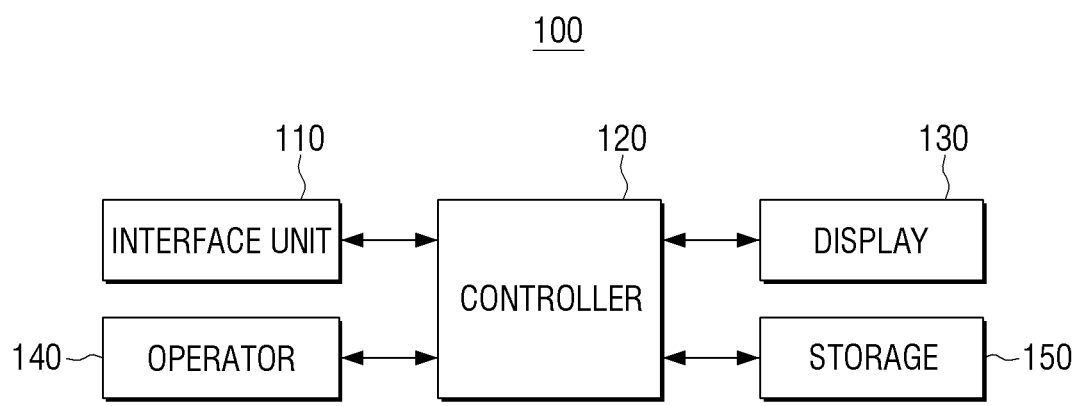
FIG. 3 is a block diagram showing a detailed configuration of the control device of FIG. 2.

FIG. 3 is a block diagram showing a detailed configuration of the control device of FIG. 2.

Referring to FIG. 3, the control device 100 includes an interface unit 110, a controller 120, a display 130, an operator 140, and a storage 150. The same configurations and the same operations of the interface unit 110 and the controller 120 as the interface unit 110 and the controller 120 of FIG. 2 will not be described.

The display 130 displays a screen. Specifically, the display 130 may display a user interface screen for controlling and monitoring the air conditioner. The display 130 may be implemented by using various display units such as a liquid crystal display (LCD) panel, a plasma display panel (PDP), an organic light emitting diode (OLED), a vacuum fluorescent display (VFD), a field emission display (FED), an electro luminescence display (ELD), or the like.

The operator 140 receives a user's operation. The operator 140 may be implemented by using various input devices. The operator 140 may be implemented by using a peripheral device which combines with the display 130, such as a touch sensor, a proximity sensor, a keyboard, or a mouse.

The storage 150 may provide a user interface and store a program for performing a control function of the control device 100. In addition, the storage 150 may record a state of the air conditioner that is determined based on collected information. The storage 150 may store authentication information for identifying a user who is authorized to manage. The storage 150 may include at least one of an auxiliary memory device such as a hard disk drive (HDD) or a solid state drive (SSD), a cloud server over a network, and a removable portable disk.

Hereinafter, the criteria for the control device 100 of FIGS. 2 and 3 to determine occurrence of an inefficient driving event will be described. Herein, it is assumed that the control device 100 does not break down. For example, in response to the control device 100 detecting the lack of refrigerant, poor power supply, a breakdown in a sensor through self-diagnosis, the control device 100 may not determine the following events.

Figure 4:
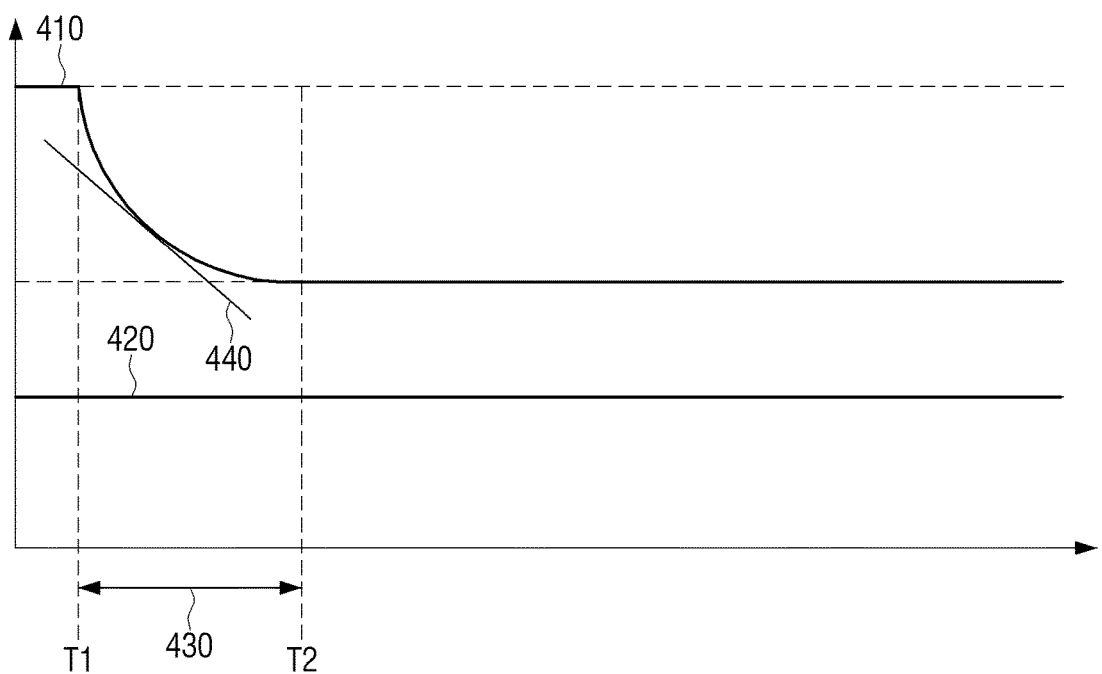
FIG. 4 is a graph to illustrate a first criterion by which the control device of the present disclosure determines occurrence of an energy loss event.

FIG. 4 is a graph to illustrate a first criterion by which the control device of the present disclosure determines occurrence of an energy loss event.

Referring to FIG. 4, a graph with a horizontal axis indicating time and a vertical axis indicating a temperature and showing a detected indoor temperature 410 and a set temperature 420 is illustrated.

The indoor temperature 410 indicates an initial room temperature state. In addition, the air conditioner initiates an air conditioning operation for cooling air to the set temperature 420 according to a user input at T1. The detected indoor temperature 410 is gradually reduced by the cooling operation of the air conditioner.

The control device 100 tracks a change in the indoor temperature 410 detected during a predetermined time 430 from T1 at which cooling is initiated. In addition, in response to the change in the indoor temperature being lower than a pre-defined initial variation value, the control device 100 determines that an event indicating inefficient driving occurs.

In other words, in response to a reduction rate 440 of the indoor temperature 410 not reaching a pre-defined rate after cooling has been initiated, the control device 100 may determine that an event occurs. For example, the air conditioner may be installed in a large place exceeding an installation limit area/capacity and thus a cooling rate that a designer expects when designing the air conditioner may not be achieved. In this case, the control device 100 may determine that an event occurs.

Figure 5:
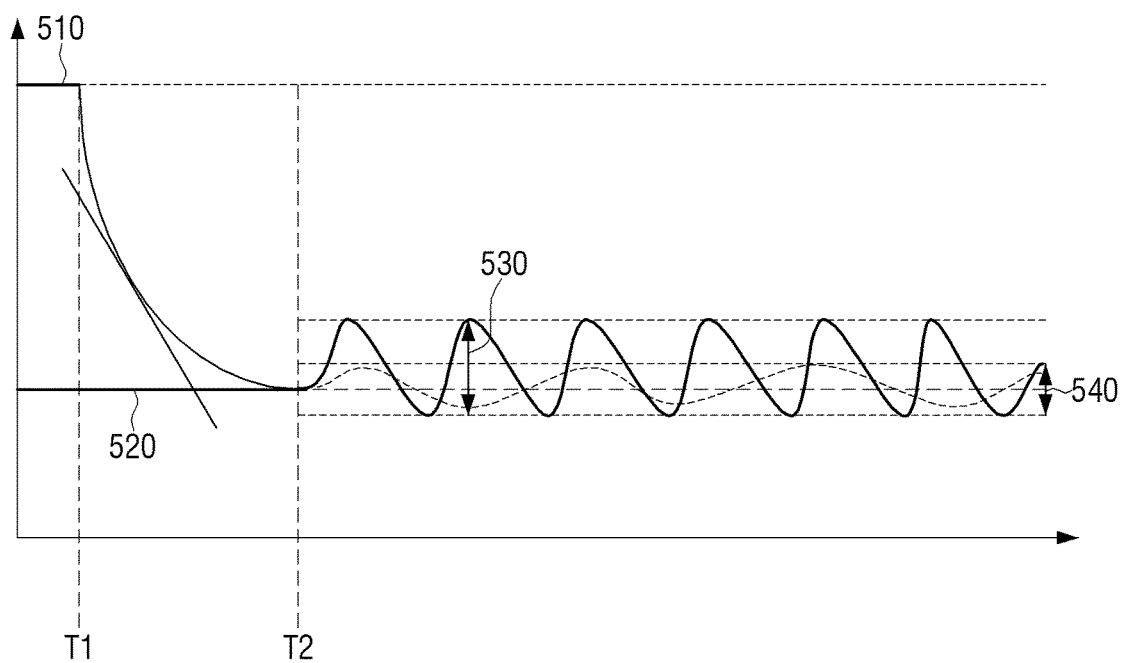
FIG. 5 is a graph to illustrate a second criterion by which the control device of the present disclosure determines occurrence of an energy loss event t.

FIG. 5 is a graph to illustrate a second criterion by which the control device of the present disclosure determines occurrence of an energy loss event.

Referring to FIG. 5, an indoor temperature 510 is reduced at a normal rate after T1 at which an air conditioning operation was initiated, and the indoor temperature 510 reaches a set temperature 520.

The air conditioner which has reached a target temperature repeats turning on and off the cooling operation in order to maintain the temperature. The indoor temperature increases while the air conditioner is temporarily turned off, and is reduced when the cooling operation is initiated again.

Herein, after a predetermined time has elapsed after the air conditioning operation was initiated (after T2), in response to a degree of change 530 in the detected indoor temperature 510 being larger than a pre-defined median variation value 540, the control device 100 determines that an event indicating inefficient driving occurs. The predetermined time may be time during which the indoor temperature 510 reaches the set temperature 520.

Specifically, a developer designs the air conditioner such that a deviation of the indoor temperature 510 which repeatedly increases and decreases under on/off control falls within a range that a person cannot feel. For example, when the air conditioner is designed to perform the air conditioning operation within a range of ±1° C. 540 from the set temperature 520, but the wide change 530 in the temperature exceeding this range is detected, the control device 100 may determine that an event occurs. For example, when a large device emitting much heat is installed in a closed space and an air conditioner for cooling this device is installed all together, the indoor temperature may abruptly increase in response to driving being stopped. In this case, it is determined that an event occurs.

Figure 6:
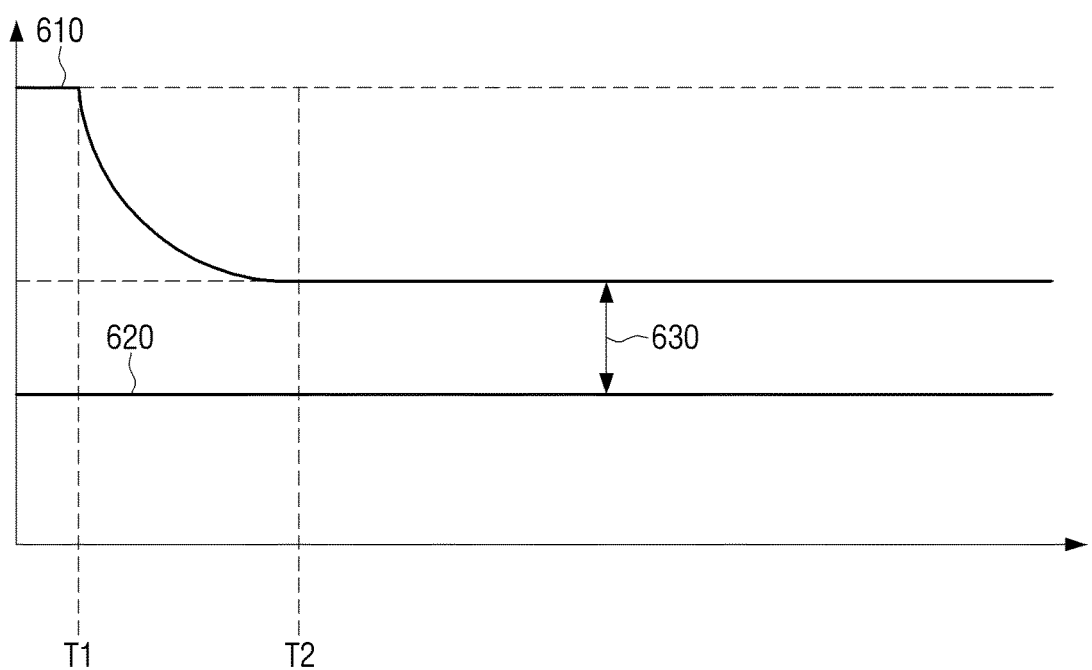
FIG. 6 is a graph to illustrate third and fourth criteria by which the control device of the present disclosure determines occurrence of an energy loss event.

FIG. 6 is a graph to illustrate a third criterion and a fourth criterion by which the control device of the present disclosure determines occurrence of an energy loss event.

Referring to FIG. 6, an indoor temperature 610 is reduced after the time that the air conditioning operation was initiated (T1). However, the indoor temperature 610 may not reach a set temperature 620. In addition, after a specific time (T2), the indoor temperature 610 may achieve thermal equilibrium and may be maintained at a specific temperature in spite of continuous cooling.

After a predetermined time has elapsed after the air conditioning operation was initiated (after T2), in response to a deviation 630 between the detected indoor temperature and the set temperature being larger than a pre-defined normal state value, the control device 100 may determine that an event indicating inefficient driving occurs. Herein, the time (T2) that the predetermined time elapses may be a time at which thermal equilibrium is achieved and the indoor temperature 610 is scarcely changed.

According to the third criterion, the control device 100 may determine that the detected indoor temperature 610 is constantly maintained. In addition, the control device 100 compares the pre-defined normal state value and the difference between the indoor temperature 610 and the set temperature 620. In response to the difference 630 between the indoor temperature 610 and the set temperature 620 being larger than the pre-defined normal state value, the control device 100 may determine that an event occurs. Herein, the pre-defined normal state value may be an arbitrary value and may be a number greater than or equal to 0.

For example, the air conditioner is driven by the maximum load in order to reduce the indoor temperature 610 to the set temperature 620. However, when a space where air conditioning is performed does not insulate well due to some reason such as an opened door, the indoor temperature 610 may not be cooled to the set temperature 620 and heat entering from the outside and cooled heat may be in equilibrium. In response to the indoor temperature 610 not being changed during a predetermined time, the control device 100 may determine that an event indicating that the indoor temperature is not reduced to the set temperature 620 even when the air conditioner performs cooling by the maximum load occurs.

According to the fourth criterion, the control device 100 may determine that the detected indoor temperature 610 is constantly maintained. In addition, the control device 100 may determine whether an event occurs or not by comparing the set temperature 620 and a threshold temperature.

For example, in response to thermal equilibrium in which the indoor temperature 610 is scarcely changed being identified, and the set temperature 620 for cooling being less than a threshold temperature of 22° C., the control device 100 may determine that an event indicating inefficient air conditioning occurs due to excessive cooling settings. To the contrary, in response to the set temperature 620 for heating being greater than or equal to a threshold temperature of 28° C., the control device 100 may determine that an event indicating inefficient air conditioning occurs due to excessive heating settings.

According to another exemplary embodiment for the fourth criterion, the control device 100 may receive measurement information including an outdoor temperature which is detected by an external sensor. In addition, in response to thermal equilibrium in which the indoor temperature 610 is scarcely changed being identified, and a difference between the detected outdoor temperature and the user's set temperature exceeding a pre-defined indoor-outdoor temperature difference (for example, 5° C.), the control device 100 may determine that an event indicating inefficient air conditioning occurs due to excessive cooling or excessive heating settings.

Figure 7:
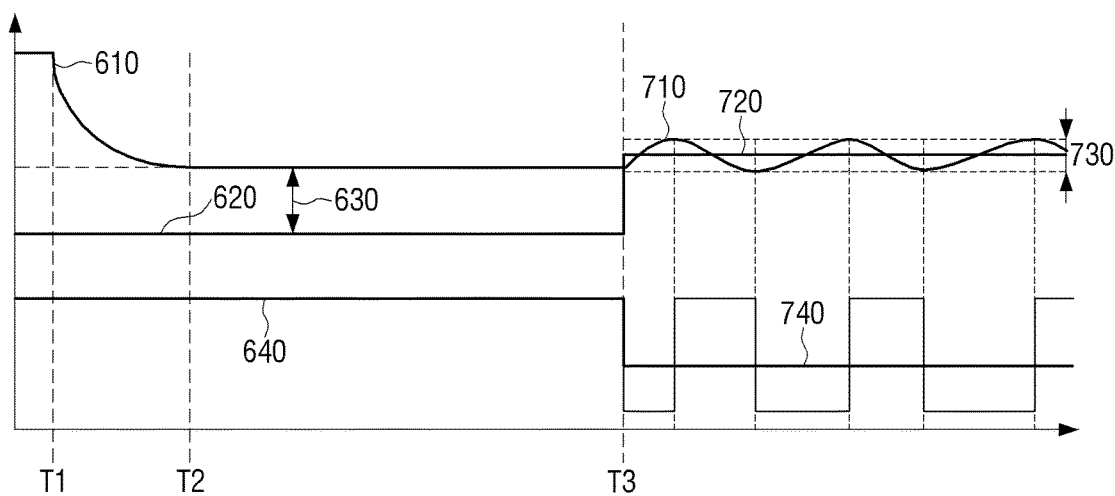
FIG. 7 is a graph to illustrate an effective set temperature control according to an exemplary embodiment.

FIG. 7 is a graph to illustrate an effective set temperature control according to an exemplary embodiment.

The effective set temperature (EST) control is defined as controlling to change the settings of the air conditioner in order to increase energy efficiency when the event of inefficient driving as described above is detected.

Referring to FIG. 7, the state before time T3 at which the EST control is applied is the same as the state shown in FIG. 6. Specifically, during the initial period in which cooling is initiated, the indoor temperature 610 is gradually reduced, but the reduction rate of the temperature becomes smaller, and as a result, the indoor temperature 610 does not reach the set temperature 620. In the thermal equilibrium state, the difference between the indoor temperature 610 and the set temperature 620 is greater than the pre-defined normal state value 630. Power consumption 640 for air conditioning of the air conditioner until this period is the maximum value that the air conditioner can use.

The control device 100 which determines the occurrence of the event increases the set temperature 620. Specifically, the control device 100 may increase the set temperature 620 to a temperature 720 higher than the indoor temperature 610.

Herein, in response to the event occurring when cooling is performed, the control device 100 may increase the set temperature 620 such that the outdoor unit of the air conditioner performs a thermo off operation at the indoor temperature 610 in the thermal equilibrium state after the predetermined time has elapsed (T2). To the contrary, in response to the event occurring when heating is performed, the control device 100 may reduce the set temperature 620 such that the outdoor unit of the air conditioner performs a thermo off operation at the indoor temperature 610 in the thermal equilibrium state after the predetermined time has elapsed (T2). The thermo off operation refers to controlling the outdoor unit to stop the air conditioning operation when a threshold temperature is reached to maintain the indoor temperature, rather than stopping the outdoor unit by a user's input.

Specifically, the air conditioner performs a cooling operation under the on/off control such that the indoor temperature 710 is changed with reference to the set temperature 720 within a deviation of ±1° C. 730. In addition, when the air conditioner continues turning on the outdoor unit and continues cooling, but cannot reduce the indoor temperature 610 anymore, the set temperature 620 may be changed to the temperature 720 which is slightly higher than the indoor temperature 610 which has been reduced to the maximum, such that the outdoor unit can be controlled to be turned on/off and the user does not feel the change in the indoor temperature. In this example, the changed set temperature 720 is higher than the indoor temperature 610 in the thermal equilibrium state by 1° C.

As described above, the control device 100 changes the set temperature, such that at least one compressor of the outdoor unit performs a thermo off operation in some time sections. Accordingly, an average 740 of power consumption is reduced in comparison to the power consumption 640 for the full load driving before the EST control is applied.

The above-described EST control may be applied to the cases of FIGS. 4 and 5. Specifically, in response to it being determined that an event according to the first criterion for comparing the change rate of the indoor temperature in the initial section occurs, the control device 100 may control to increase (reduce) the set temperature 420 of the air conditioner which is set to be low (high) in an environment in which it is difficult to reduce (increase) the indoor temperature 410, such that air conditioning to cool (heat) is not performed for a very long time until the set temperature is reached.

In addition, in response to it being determined that an event according to the second criterion for comparing the range of change in the indoor temperature in the middle section occurs, the control device 100 may change the set temperature 520, such that the increase and decrease range 530 of the indoor temperature 510 is reduced and thus on time relatively longer than off time of the outdoor unit can be reduced.

Figure 8:
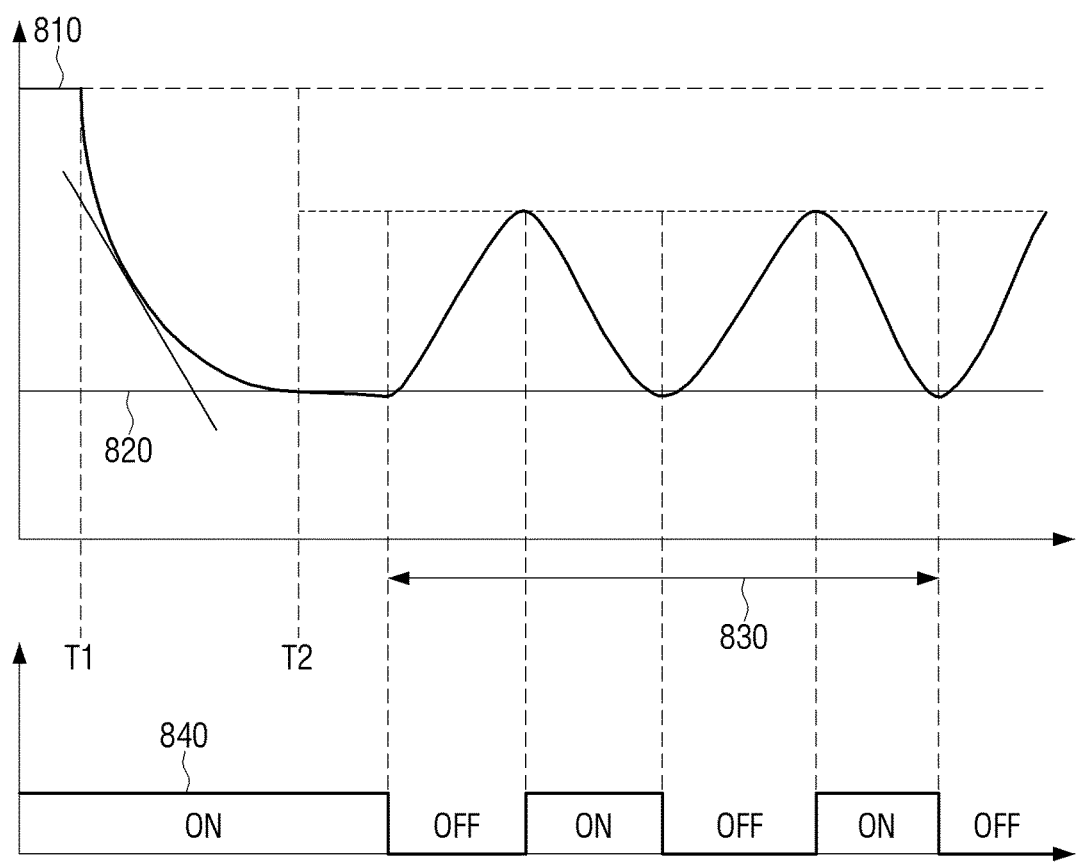
FIG. 8 is a graph to illustrate a fifth criterion by which the control device of the present disclosure determines occurrence of an energy loss event.

FIG. 8 illustrates graphs to illustrate a fifth criterion by which the control device of the present disclosure determines occurrence of an energy loss event.

Referring to FIG. 8, the upper graph of the two graphs shows a change in an indoor temperature 810 with time, and the lower graph shows a driving on/off state 840 of the air conditioner with time according to a user's input.

An indoor temperature 810 is reduced to a set temperature 820 by the air conditioning operation of the air conditioner which has been initiated after power was initially turned on. Thereafter, the air conditioner is repeatedly turned on and off according to a user's input. In the example of FIG. 8, the air conditioner is turned on two times and turned off two times according to a user's input during a predetermined time 830.

According to the fifth criterion, in response to a user's input to initiate and terminate the air conditioning operation being repeated a predetermined number of times during a predetermined time, the control device 100 may determine that an event occurs. In other words, the control device 100 may determine a changeable user input.

For example, the air conditioner may be installed in a space where there exist many users, and the users preferring different temperatures may frequently turn on and off the air conditioner. In this case, the control device 100 may change the set temperature 820 to an appropriate average temperature. As described above, the EST control can reduce power which is consumed by device initialization and refrigerant cycle preparation required every time the air conditioner is turned on and off.

Figure 9:
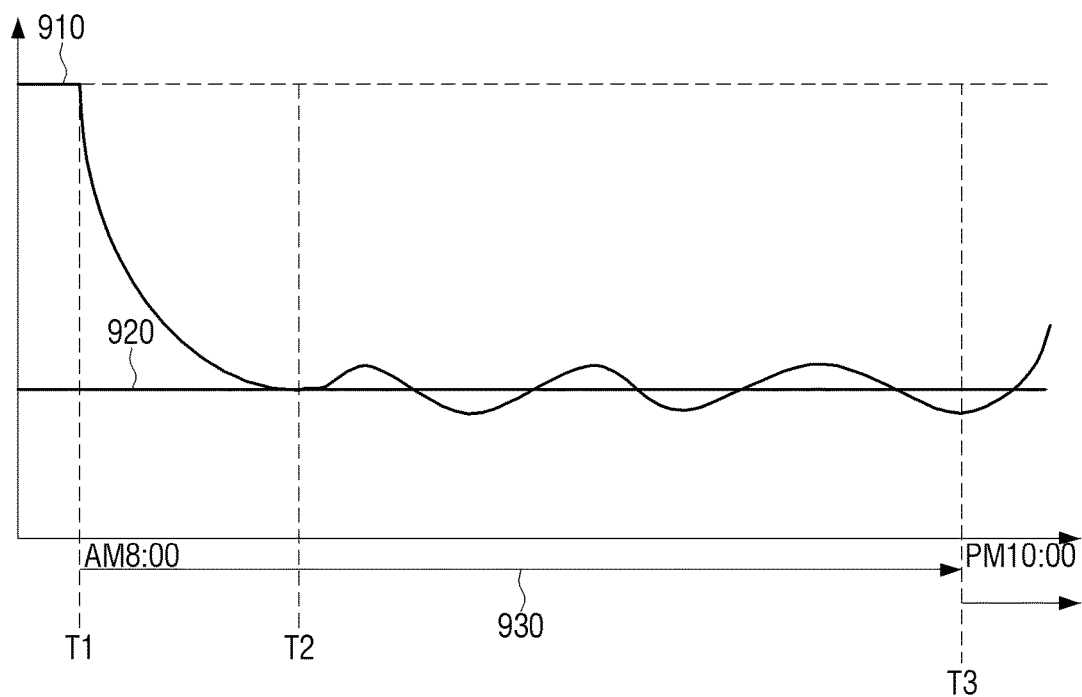
FIG. 9 is a graph to illustrate sixth and seventh criteria by which the control device of the present disclosure determines occurrence of an energy loss event.

FIG. 9 illustrates a graph to illustrate a sixth criterion and a seventh criterion by which the control device of the present disclosure determines occurrence of an energy loss event.

Referring to FIG. 9, the air conditioner initiates the air conditioning operation at T1 and terminates the air conditioning operation at T3. According to the sixth criterion, in response to time 930 during which the air conditioning operation has been performed after the air conditioning operation was initiated exceeding a predetermined continuous time, the control device 100 may determine that an event of inefficient driving occurs, and control the air conditioner to stop the air conditioning operation. In other words, the sixth criterion is to determine whether the air conditioner is neglected after it is driven.

For example, the control device 100 may count how much time has elapsed after time (T1) that the air conditioner initiated the air conditioning operation. In addition, in response to the time 930 during which the air conditioner remains on being longer than or equal to 12 hours, the control device 100 stops the air conditioner.

According to the seventh criterion, in response to the initiated air conditioning operation continuing until a predetermined end time (T3), the control device 100 may determine that an event occurs and control the air conditioner to stop the air conditioning operation. In other words, the seventh criterion is to terminate the supply of cooling and heating when the predetermined time (T3) is reached, and thereafter, to drive the air conditioner individually when necessary.

For example, the control device 100 determines that 8 a.m. at which the air conditioning operation is initiated is before 10 p.m. which is the predetermined end time. In addition, the control device 100 identifies a turned-on air conditioner at 10 p.m. and determines that an event of inefficient driving occurs, and then turns off the air conditioner. The next end time may be 10 p.m. of the next day or there may exist one or more predetermined end times at dawn. The above-described EST control can prevent unnecessary power consumption when the user forgets to turn off the air conditioner.

Figure 10:
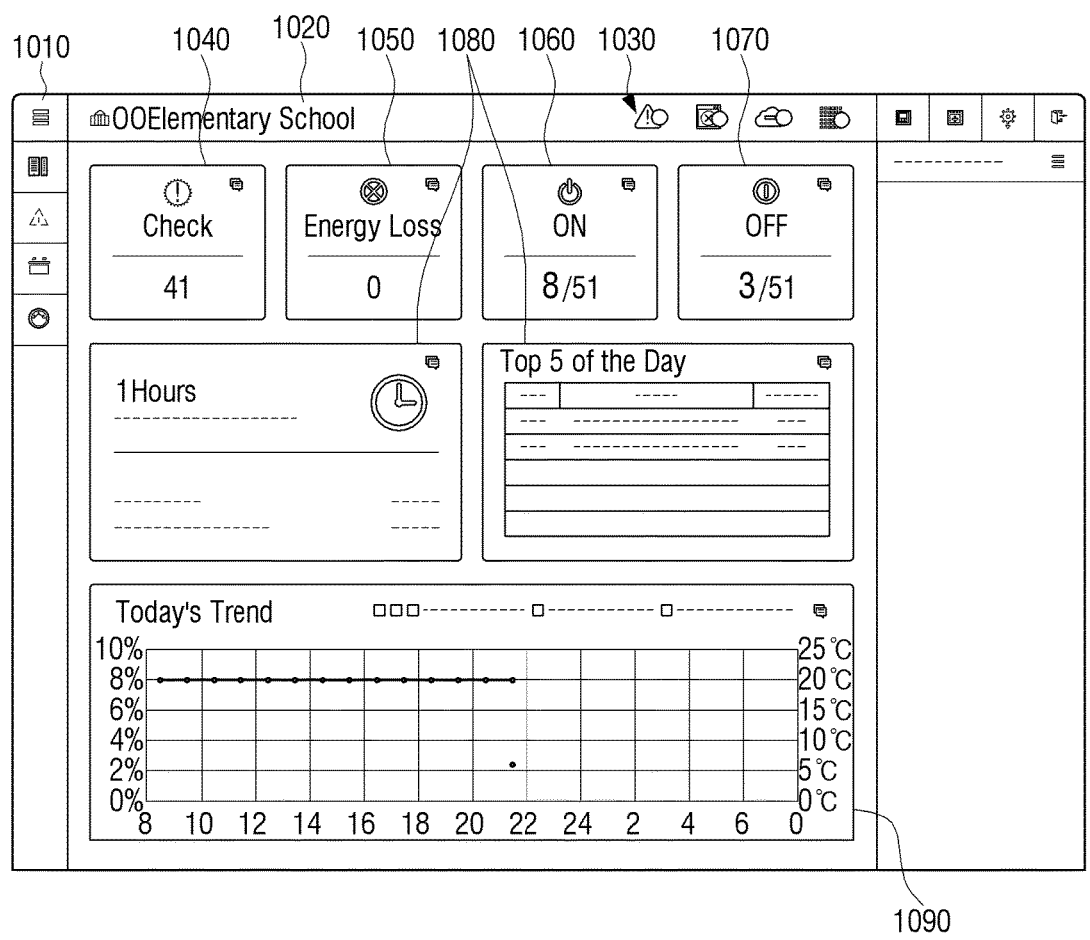
FIGS. 10 and 11 are views illustrating a user interface according to an exemplary embodiment.
Figure 11:
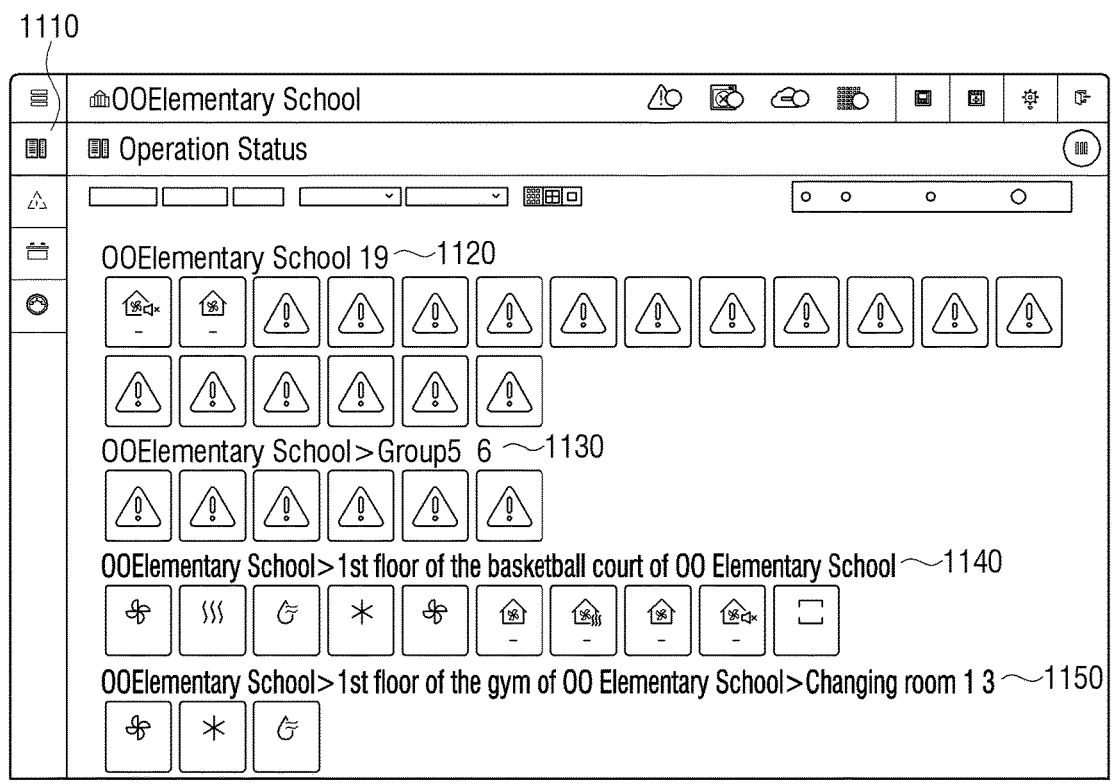

FIGS. 10 and 11 are views showing a user interface screen according to an exemplary embodiment.

Referring to FIG. 10, an overview page screen showing the overall state of the air conditioning system 1000 installed in a certain elementary school is illustrated. The overview page is displayed first in response to a user accessing the server 50 and is displayed in response to an icon located on the uppermost end of a left column menu being selected 1010.

On a top area 1020 of the screen, the name of the elementary school and a plurality of state icons 1030 and function menus are displayed. The plurality of state icons 1030 may indicate a plurality of different events, and the number of times an event occurs is displayed overlapping the icons.

A body area in the center of the screen includes graphic objects 1040, 1050, 1060, and 1070 indicating a check event, an energy loss event, an on-state, and an off-state, respectively. The check event object 1040 indicates occurrence of an event that should be checked by an air conditioning manager, such as switching on or off an indoor unit, switching an air conditioning operation under automatic control, and finding a breakdown by self-diagnosis, and the number of times the event occurs. In the example of FIG. 10, the check event object 1040 includes a number indicating that the check event occurs 41 times.

The energy loss event may indicate occurrence of an event indicating inefficient driving, which is determined according to the above-described criteria, and the number of times the event occurs. In the example of FIG. 10, the energy loss event object 1050 includes number 0 since there is no new event that the manager fails to check.

The on-state object 1060 indicates the presence of an air conditioner which is working and the number of working air conditioners from among the total number of air conditioners. In the example of FIG. 10, 8 of 51 air conditioners are performing the air conditioning operation.

The off-state object 1070 indicates the presence of an air conditioner which stops working and the number of air conditioners which stop working from among the total number of air conditioners. In the example of FIG. 10, 3 of 51 air conditioners are turned on, but do not perform the air conditioning operation.

The body area includes sections including statistical information. Specifically, the first and second sections 1080 include information on an average driving time of the air conditioners and top 5 air conditioners which are most frequently used for a day. In the example of FIG. 10, the first section on the left shows that the average driving time until 13 o'clock is 1 hour, the average driving time of last month is 2 hours, and an estimated average driving time of this month is 2 hours. The second section on the right shows information on two air conditioners in the basketball court which are ranked first and second since they are used for 1 hour and 55 minutes.

The body area includes a graph. Specifically, a graph 1090 on the lower end illustrates an indoor temperature (° C.) detected with time and a working ratio (%) of an air conditioner according to the indoor temperature (° C.) and time.

FIG. 11 shows an operation state page screen which is displayed in response to the second icon 1110 on the left column menu being selected. The top area on the screen of FIG. 10 is maintained and only the body area is changed.

The body area displays the states of the air conditioners which are being monitored in the form of graphic objects. In the example of FIG. 11, 19 indoor units are installed in the main building of a OO elementary school, and accordingly, 19 graphic objects are listed in a OO elementary school item 1120. 6 indoor units are installed in an annex from among additional facilities of the OO elementary school, and accordingly, 6 graphic objects are listed in an item 1130 classified as sub group 5 subordinate to the OO elementary school. 10 indoor units are installed on the first floor of the basketball court of the OO elementary school, and accordingly, 10 graphic objects are listed in an item 1140 classified as the first floor of the basketball court subordinate to the OO elementary school. In addition, three indoor units are installed in the first changing room of the first floor of the gym of the OO elementary school, and accordingly, three graphic objects are listed in an item 1150 classified as changing room 1 subordinate to the first floor of the gym.

A manager may check whether the indoor units installed in each place are currently being driven or a specific event occurs or not at a glance. Referring to the example of FIG. 11, the six graphic objects in the item 1130 of group 5 are displayed by exclamation marks indicating the occurrence of the pre-defined events. The three indoor units in the item 1150 of changing room 1 are all being driven. One indoor unit performs ventilating, another indoor unit performs cooling, and the other indoor unit performs dehumidifying. The two of the 19 indoor units in the main building of the elementary school, in which an event does not occur, have low-noise ventilation and ventilation function set therein, and are turned off. The graphic objects indicating the two turned-off indoor units are displayed by grey color.

Figure 12:
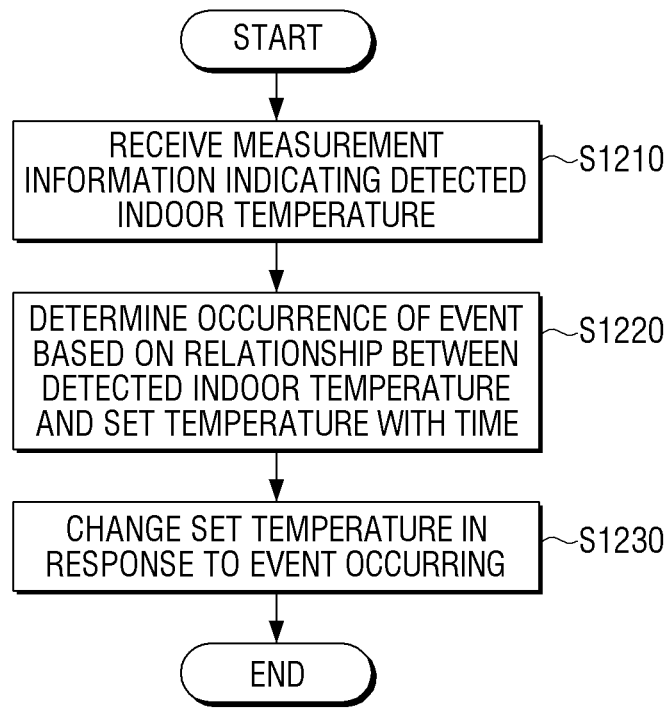
FIG. 12 is a flowchart to illustrate a control method according to an exemplary embodiment.

FIG. 12 is a flowchart to illustrate a control method according to an exemplary embodiment.

Referring to FIG. 12, the control method of the air conditioner includes the following steps. First, measurement information indicating a detected indoor temperature is received (S1210). Specifically, the control method includes a step of acquiring indoor temperature information. The control device performing the control method may acquire an indoor temperature from its own temperature detection sensor, or may receive measurement information indicating an indoor temperature from an indoor unit communicably connected therewith.

Next, it is determined whether an event occurs or not based on a relationship between the detected indoor temperature and a set temperature (S1220). Specifically, the control method includes a step of, after initializing an air conditioning operation of the air conditioner, determining whether an event indicating inefficient driving occurs or not based on the indoor temperature which is changed by the air conditioning operation performed according to the set temperature. The control device performing the control method may determine that the air conditioning operation is initiated, and determine whether an event indicating inefficient driving occurs or not in consideration of a degree, a time, and a state of the change in the indoor temperature. A criterion for determining the occurrence of the event is the same as described above with reference to FIGS. 4 to 6, and a redundant explanation thereof is omitted.

Next, in response to an event occurring, the set temperature is changed (S1230). Specifically, the control method may include a step of, in response to it being determined that the event occurs, changing the set temperature. The control device performing the control method may increase energy efficiency by changing the set temperature of the air conditioner. Step S1230 may include a step of increasing the set temperature in response to cooling being performed, and a step of reducing the set temperature in response to heating being performed. Herein, the set temperature may increase in the case of cooling or may be reduced in the case of heating until the set temperature reaches a temperature at which a thermo off operation is performed by the EST control described in FIG. 7.

The control method may further include a step of determining that the event occurs in response to the time during which the air conditioning operation is performed exceeds a predetermined continuous time or the initiated air conditioning operation continuing until a predetermined end time, and stopping the air conditioning operation. A detailed description of this step is the same as described in FIG. 8.

In addition, the control method may determine that an event of inefficient driving occurs in response to a user's input to initiate and terminate the air conditioning operation is repeated a predetermined number of times or more within a predetermined time (S1220), and change the set temperature (S1230). In addition, the control method may further include a step of disregarding a direct control command. Specifically, in response to energy being consumed inefficiently due to an input of a repetitive on/off command on a specific indoor unit, the control device may set the air conditioner to disregard a control signal of a controller such as a remote control 30. In addition, the control device may set an auto mode in the air conditioner, may input standard settings, or may turn off the air conditioner.

Figure 13:
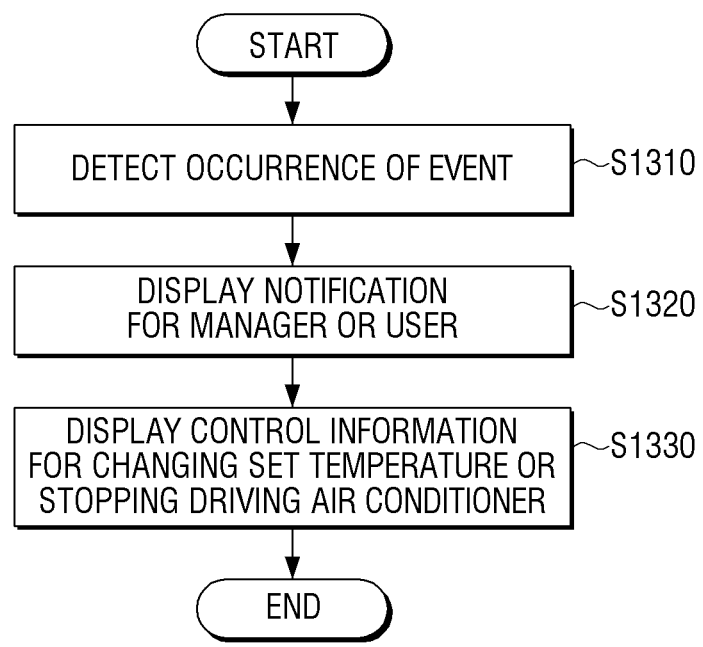
FIG. 13 is a flowchart to illustrate a display method related to the control method of FIG. 12.

FIG. 13 is a flowchart to illustrate a display method related to the control method of FIG. 12.

Referring to FIG. 13, the display method starts from step S1220 of the control method of FIG. 12 of determining the occurrence of the event.

First, the occurrence of the event is detected (S1310). Specifically, the control device may detect that the event according to the pre-defined criterion occurs by receiving the result of determining the occurrence of the event.

Next, an event notification is displayed (S1320). Specifically, the control device may display a notification screen to notify a user or manager of the occurrence of the event.

Next, control information for changing the set temperature or stopping driving is displayed (S1330). Specifically, the control device may display the control information for changing the set temperature of the air conditioner or stopping driving in step S1230, that is, according to the EST control.

The above-described display method may further include a step of displaying a user interface screen, and the user may control the air conditioner through the displayed user interface. In addition, the user may set whether to apply the EST control and a target to apply the EST control through the user interface.

The above-described control method can increase the energy efficiency of the air conditioner. In addition, the control method may be implemented by the control device 100 having the configurations of FIGS. 2 and 3, and also may be implemented by other types of electronic devices. The above-described display method may be implemented by the control device 100 of FIG. 3, and also may be implemented by other electronic device including a display.

In addition, the control method and the display method of the air conditioner described above may be implemented by using at least one execution program for executing the above-described control method, and the execution program may be stored in a computer-readable recording medium.

Accordingly, each block of the present disclosure may be embodied as a computer-recordable code on a computer-readable recording medium. The computer-readable recording medium may be a device which stores data readable by a computer system.

Examples of the computer-readable recording medium include a read only memory (ROM), a random access memory (RAM), CD-ROMs, a magnetic tape, a floppy disk, an optical disk, an optical data storage device, and an image display device including the storage device such as a television. In addition, the computer-readable code may be embodied as a computer data signal of a carrier wave.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A control device of an air conditioner, the control device comprising: an interface configured to receive measurement information indicating an indoor temperature; and a controller configured to:

based on the indoor temperature of the received measurement information, perform an air conditioning operation according to a set temperature which is input by a user, based on a rate of a change of the indoor temperature being lower than a predetermined rate during a first predetermined time from a time at which the air conditioning operation is performed, determine whether an event occurs, based on a range of a change of the indoor temperature being higher than a predetermined range during a second predetermined time from a time at which the indoor temperature reaches the set temperature, determine whether the event occurs, and in response to the event occurring, change the set temperature, wherein the controller is further configured to:

based on the air conditioning operation being a cooling operation, increase the set temperature according to the occurrence of the event, and based on the air conditioning operation being a heating operation, decrease the set temperature according to the occurrence of the event.

2. The control device of claim 1, wherein the controller is configured to, based on a deviation between the indoor temperature of the received measurement information and the set temperature, detected after the first predetermined time elapses after the air conditioning operation is performed, being higher than a pre-defined normal state value, determine that the event occurs.

3. The control device of claim 2, wherein
the controller is configured to, based on the deviation being higher than the pre-defined normal state value, the set temperature being lower than a threshold cooling temperature during a cooling operation, and the set temperature being higher than a threshold heating temperature during a heating operation, determine whether the event occurs.

4. The control device of claim 1, wherein the event is related to an amount of power consumed for driving an outdoor unit of the air conditioner.

5. The control device of claim 4, wherein the controller is configured to based on the event occurring during a cooling operation, increase the set temperature such that an outdoor unit of the air conditioner is turned off at the received measurement information after the first predetermined time elapses, and wherein the controller is configured to, based on the event occurring during a heating operation, reduce the set temperature such that an outdoor unit of the air conditioner is turned off at the indoor temperature of the received measurement information after the first predetermined time elapses.

6. The control device of claim 1, wherein the controller is configured to, based on a time during which the air conditioning operation is performed exceeding a predetermined continuous time or the air conditioning operation continuing until a predetermined end time, determine whether the event occurs and control the air conditioner to stop the air conditioning operation.

7. The control device of claim 1, wherein; the controller is configured to, based on a user's input to initiate and terminate the air conditioning operation being repeated a predetermined number of times or more within a third predetermined time, determine whether the event occurs.

8. The control device of claim 1, wherein the interface is connected with a plurality of air conditioners, and wherein the control device further comprises a display configured to display an air conditioning state of each of the plurality of air conditioners and information on whether the event occurs.

9. A control method comprising:

receiving, by an interface of an air conditioner, measurement information indicating an indoor temperature; and by a controller of the air conditioner:

based on the indoor temperature of the received measurement information, performing an air conditioning operation according to a set temperature which is input by a user, based on a rate of a change of the indoor temperature being lower than a predetermined rate during a first predetermined time for a time at which the air conditioning operation is performed, determining whether an event occurs, based on a range of a change of the indoor temperature being higher than a predetermined range during a second predetermined time from a time at which the indoor temperature reaches the set temperature, determining whether the event occurs, and in response to the event occurring, changing the set temperature, wherein the changing includes:

based on the air conditioning operation being a cooling operation, increasing the set temperature according to the occurrence of the event, and based on the air conditioning operation being a heating operation, decreasing the set temperature according to the occurrence of the event.

10. The control method of claim 9, wherein the determining comprises, based on a deviation between the indoor temperature of the received measurement information and the set temperature, detected after the first predetermined time elapses after the air conditioning operation is performed, being higher than a pre-defined normal state value, determining whether the event occurs.

11. The control method of claim 10, wherein the determining comprises, based on the deviation being higher than the pre-defined normal state value, the set temperature being lower than a threshold cooling temperature during a cooling operation, and the set temperature being higher than a threshold heating temperature during a heating operation, determining whether the event occurs.

12. The control method of claim 9, wherein the event is related to en amount of power consumed for driving an outdoor unit of the air conditioner.

13. The control method of claim 10, wherein the changing further includes:

based on the event occurring during a cooling operation, increasing the set temperature such that an outdoor unit of the air conditioner is turned off at the indoor temperature of the received measurement information after the first predetermined time elapses, and based on the event occurring during a heating operation, reducing the set temperature such that an outdoor unit of the air conditioner is turned off at the indoor temperature of the received measurement information after the first predetermined time elapses.

14. The control method of claim 9, further comprising, by the controller, based on a time during which the air conditioning operation is performed exceeding a predetermined continuous time or the air conditioning operation continuing until a predetermined end time, determining whether the event occurs and stopping the air conditioning operation.

15. The control method of claim 9, wherein the determining comprises, based on a user's input to initiate and terminate the air conditioning operation being repeated a predetermined number of times or more within a third predetermined time, determining whether the event occurs.

16. The control method of claim 9, further comprising:

connecting, by the interface, to a plurality of air conditioners, and displaying, by a display of the air conditioner, an air conditioning state of each of the plurality of air conditioners and information on whether the event occurs.

* * * * *